United States Patent [19]

Schoenmeyr

[11] Patent Number: 5,203,803
[45] Date of Patent: Apr. 20, 1993

[54] REVERSE OSMOSIS WATER PURIFIER BOOSTER PUMP SYSTEM

[75] Inventor: Ivar Schoenmeyr, Mission Viejo, Calif.

[73] Assignee: Aquatec Water Systems, Inc., Anaheim, Calif.

[21] Appl. No.: 755,165

[22] Filed: Sep. 5, 1991

Related U.S. Application Data

[63] Continuation-in-part of Ser. No. 679,791, Apr. 3, 1991, abandoned.

[51] Int. Cl.⁵ ............................................. F04B 49/02
[52] U.S. Cl. ....................... 417/38; 137/512.2; 210/416.3; 417/296; 417/413 R
[58] Field of Search ............. 210/416.3; 417/296, 417/413, 38, 36, 269, 307; 137/512.2, 512.3

[56] References Cited

U.S. PATENT DOCUMENTS

| | | | |
|---|---|---|---|
| 1,943,102 | 1/1934 | Woodruff | 417/296 |
| 3,018,737 | 1/1962 | Cook et al. | 417/269 |
| 3,199,531 | 8/1965 | Cornelius et al. | 417/36 |
| 3,509,824 | 5/1970 | Schmidly, Jr. | 417/12 |
| 3,632,505 | 1/1972 | Nelson . | |
| 3,671,142 | 6/1972 | Calabrese | 417/36 |
| 3,821,108 | 6/1974 | Manjikian . | |
| 4,081,621 | 3/1978 | Hartley . | |
| 4,124,488 | 11/1978 | Wilson . | |
| 4,162,876 | 7/1979 | Kolfertz . | |
| 4,242,061 | 12/1980 | Hartley | 417/269 |
| 4,253,962 | 3/1981 | Thompson . | |
| 4,295,793 | 10/1981 | McGalliard | 417/36 |
| 4,391,712 | 7/1983 | Tyler . | |
| 4,507,054 | 3/1985 | Schoenmeyr | 417/296 X |
| 4,507,058 | 3/1985 | Schoenmeyr | 92/12.2 X |
| 4,528,093 | 7/1985 | Winer | 210/416.3 |
| 4,602,707 | 7/1986 | Zumwinkel et al. | 137/512.2 X |
| 4,604,194 | 8/1986 | Entingh . | |
| 4,610,605 | 9/1986 | Hartley | 417/269 |
| 4,623,467 | 11/1986 | Hamlin . | |
| 4,695,375 | 9/1987 | Tyler . | |
| 4,761,295 | 8/1988 | Casey . | |
| 4,773,993 | 9/1988 | Yoda et al. . | |
| 4,797,069 | 1/1989 | Hartley et al. | 417/222 R |
| 4,799,957 | 1/1989 | Vogel | 310/253 X |
| 4,814,086 | 3/1989 | Bratt . | |
| 5,004,535 | 4/1991 | Bosko et al. | 210/90 |

Primary Examiner—Leonard E. Smith
Attorney, Agent, or Firm—Blakely, Sokoloff, Taylor & Zafman

[57] ABSTRACT

A reverse osmosis water purification system that incorporates a high torque low speed motor to drive a pump, such that the pump can continuously pump water from a source of water to an osmotic membrane. The system may have a reservoir to store the purified water as it is pumped through the osmotic filter. The system can also have a transformer and rectifier to convert and rectify an alternating electrical power source to 24 volt DC power for the motor. The transformer having a higher impedance than the motor such that the transformer acts as a current limiter in the event the motor stalls. The pump has an internal pressure relief valve operatively connected to the inlet of the pump housing. The relief valve opens when the output pressure of the diaphragm piston reaches a predetermined valve. The relief valve allows the high pressure water to flow back into the housing inlet creating a flow loop from the inlet back to the water source.

17 Claims, 5 Drawing Sheets

REVERSE OSMOSIS WATER PURIFIER BOOSTER PUMP SYSTEM

This application is a continuation-in-part of application Ser. No. 679,791, filed on Apr. 3, 1991, now abandoned.

BACKGROUND OF THE INVENTION

1. Field of the Invention

The present invention relates to reverse osmosis water purification systems and pumping systems for pumping water to an osmosis membrane.

2. Description of Related Art

Water purification is becoming increasingly popular among todays health conscious consumers. One type of purification process includes pumping tap water through an osmotic membrane that filters out impurities in the water. The membranes typically produce a large pressure drop and therefore require a high inlet pressure to push the water through the membrane. Some municipal water systems do not provide a line pressure that is high enough to be used with an osmotic membrane and therefore a pump must be interposed between the reverse osmosis (RO) unit and water source to increase the pressure of the water to a predetermined operating level. Typically the suction side of the pump is connected directly to a water faucet, wherein the pump and RO unit are a detachable unit. To obtain the high pressures necessary it is preferable to use a positive displacement pump. Available pumps today have been designed with economy and efficiency in mind and thus utilize a DC motor operating in its most efficient speed, typically 1500 to 6000 RPM. Since it takes the same power to do a given amount of work whether the pumps operate at high or low voltages, the current needed to drive a low voltage motor is higher than the corresponding current for a high voltage motor. To minimize unnecessary power losses, low voltage motors are typically fitted with low resistance copper brushes. This type of pump produces a flow rate greater than the flow through the membrane and therefore an accumulator is typically attached in line, to store the excess water produced by the pump under pressure to reduce the on-off cycling of the pump.

The pump turns on when the inlet pressure at the RO unit drops below a predetermined level. The pump supplies water to the RO unit and accumulator until a predetermined upper pressure limit is reached at which point the pump turns off. The accumulator then supplies the osmotic membrane with water until the pressure at the RO unit inlet drops below the lower limit. Typical pumps have a flow rate ten times the flow rate through the membrane, wherein the pump is actually operating less than ten percent of the time. The constant starting of the pump is noisy and tends to reduce the life of the pump. Additionally, pressure switches must be incorporated to measure the water pressure on the output of the pump and to start and stop the pump when the respective lower and upper pressure limits are reached. The pressure switches have slow response times and are subject to fatigue. A pump that is used in present reverse osmosis water treatment systems is disclosed in U.S. Pat. No. 4,610,605 issued to Hartley. The Hartley device is a positive displacement pump with a pressure switch that starts and stops the pump motor based on the fluid pressure on the output port of the pump. Although this pump is acceptable, what is desired is a reverse osmosis system and pump that does not constantly cycle the pump or require a bulky accumulator.

Operating a pump at say typically 20% duty cycle for a continuous duty requirement such as a filtration membrane results in a power requirement during the operational mode that is five times that of a continuously operating pump. The power supply thus has to be sized for the actual operating requirement resulting in the usage of a large component with high no-load losses.

The pump motors typically used with present pumps are permanent magnet DC motors operating on 24 Volt full wave rectified and filtered 60 hertz power. When a DC motor is started, its initial impedance is equal to its winding resistance, resulting in a high starting current that slowly abates as the motor picks up speed and inductance from the changing field is created. The motors currently used run into problems when started and stopped frequently in that their windings tend to overheat, shortening the overall life of the motor. Also the copper brushes running against the copper commutators create equal wear on both surfaces forcing a costly replacement of the armature when replacing worn brushes. These motors run into problems when used with pumps having pressure switches, in that if the voltage supplied to the motor drops while the pressure switch is closed (when the pump is running) the electric motor will stall, which can damage and sometimes destroy the motor. It is thus desirable to have a pump motor that will not stall under varying load conditions.

SUMMARY OF THE INVENTION

The present invention is a reverse Osmosis water purification system that incorporates a high torque low speed motor to drive a pump, such that the pump can continuously pump water from a water source to an osmotic membrane. The low speed of the motor produces a low flow rate from the pump to the membrane equal to the flow rate through the membrane so that an accumulator is not needed. The high torque capability of the motor insures that the motor doesn't stall while pumping the water at the high pressures needed to force the water through the membrane. The system may have a reservoir to store the purified water as it is pumped through the RO unit. The reservoir may have means to turn the motor and pump on and off to fill the reservoir to a predetermined level. The motor may have its rectifier mounted internally to effectively shield radio frequency interfering electric noise generated. The high torque low voltage motor may use carbon brushes to minimize wear of the commutator. The system can also have a transformer to convert an alternating electrical power source to a low safe (24 volt AC) voltage for the motor. The transformer may have a higher impedance than the motor, such that the transformer acts as a current limiter in the event the motor stalls.

The pump can be a positive displacement diaphragm actuated device that has a wobble plate connected to the motor. The pump has an internal pressure relief valve operatively connected to the inlet of the pump housing. The relief valve opens when the output pressure of the pump reaches a predetermined level. The relief valve allows the high pressure water to flow back into the housing inlet creating a flow loop from the inlet back to the water source. The relief valve provides pressure relief in the event the pressure in the system exceeds operating levels. The relief valve also allows the pump to run continuously, even if the flow rate of the pump exceeds the flow rate across the osmotic membrane. Thus the same pump can be used for different types and sizes of RO units, wherein if the flow rate across the membrane is lower than the flow rate of the pump, the pump can still continuously run without an accumulator to absorb the excess water. The relief valve can be easily constructed by taking an existing diaphragm pump and attaching spring loaded valves that close off openings that are drilled into the existing valve plates of the pump. The relief valve can be constructed so that the pump produces an audible sound when the relief valve is opening, providing an indicator of when the pump is in a bypass condition. In the alternative, the relief valve can be constructed so that the valve opens and closes at different pressures, thereby preventing oscillation of the valve.

Therefore it is an object of this invention to provide a reverse osmosis water purification system that incorporates a pump that continuously pumps water from a water source to an osmotic membrane.

It is also an object of this invention to provide a pump that has a pressure relief valve that is easily retrofitted onto an existing off the shelf pump.

It is an object of this invention to provide a relief valve option that gives an audible signal at a preset pressure.

It is also an object of this invention to provide a pump motor for a reverse osmosis water purification system that is quiet in its operation, and which has a long life.

It is also an object of this invention to provide a power supply-motor combination in which the power supply is not damaged in the event of a motor stall.

It is also an object of this invention to introduce a low speed drive to a diaphragm pump (without the need for a gear box) that minimizes flex damage due to heat build-up in the diaphragm.

It is also an object of this invention to introduce a low speed motor to a household appliance to minimize noise created by the mechanical components.

BRIEF DESCRIPTION OF THE DRAWINGS

The objects and advantages of this invention will become more readily apparent to those skilled in the art after reviewing the following detailed description and accompanying drawings, wherein.

DETAILED DESCRIPTION OF THE INVENTION

Figure 1:
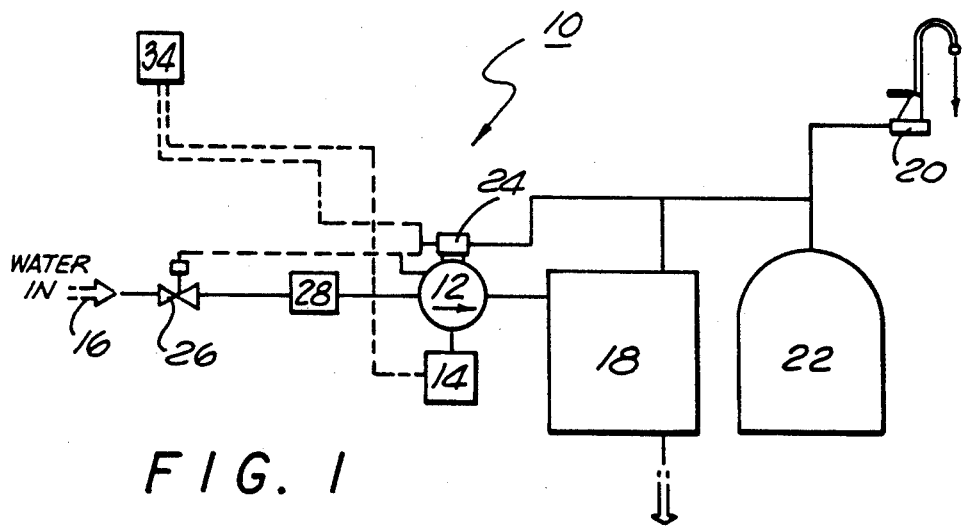
FIG. 1 is schematic of a reverse osmosis water purification system of the present invention.

Referring to the drawings more particularly by reference numbers, number 10 is a reverse osmosis water purification system which in its most basic form comprises a pump 12, and a motor 14 to drive the pump 12, such that the pump 12 delivers unpurified water from a water source 16 to a RO unit 18. The RO unit 18 has an osmotic membrane (not shown) that filters out the impurities from the water as the fluid is pushed across the membrane The purified water then flows to an output tap 20 where it can be used. The motor 14 has a high torque low speed output such that the pump 12 supplies water to the RO unit 18 at high pressures and low flow rates. The pump output pressure and flow rate should ideally match the pressure and flow rate requirements of the osmotic membrane, such that the pump 12 supplies enough pressure to push the water through the membrane, while providing a flow rate equal to the flow across the membrane. The compatible flow rate allows the pump 12 to continuously run without the need for pressure switches or an accumulator to take up the excess water as the pump 12 is pumping the water to the RO unit 18. This is a considerable advantage over the prior art in that the pump does not have to be constantly started and stopped to allow the RO unit 18 to catch up with the pump 12. This reduces wear on the motor 14 and pump 12 and also reduces the need and cost for an accumulator, which is bulky, and pressure switches which tend to wear out and fail.

The system 10 may also have a pressurized reservoir 22 to store the purified water as it comes out of the RO unit 18, providing the user with a ready supply of purified water. The pump 12 may have a pressure switch 24 connected to the reservoir 22, to stop the motor 14 when the pressure within the reservoir 22 exceeds a predetermined level. The switch 24 starts the pump 12 back up when the reservoir 22 pressure drops below a predetermined level, to insure that the reservoir 22 has an adequate supply of purified water. This pressure switch 24 operates differently than pressure switches in the prior art which started and stopped the pump according to the pump output pressure. The prior art switches monitored the pressure of the osmotic membrane, constantly stopping the pump because the flow rate across the membrane was typically one-tenth the flow rate of the pump. The pressure switch 24 of the present invention starts the pump 12 only when the reservoir pressure decreases, which occurs when a certain amount of purified water has been taken from the tank 22. When the pressure switch 24 starts the pump 12 up, the pump 12 stays on, pumping water to the RO unit 18 and reservoir 22 until the tank 22 reaches the predetermined pressure level. This cycle occurs only as frequently as the water is being used. The pressure switch 24 provides a means of controlling water flow, cutting down the amount of water running through the system 10 which inevitably conserves water and saves cost. It is desirable to set the upper and lower pressure levels such that the pump 12 does not have to run every time the user draws a glass of water, it being preferable to have the pump 12 run continuously for a predetermined amount of time to prevent on and off cycling while small amounts of water are withdrawn. The pressure switch 24 can also be attached to a solenoid valve 26 connected between the water source 16 and pump 12, to shut off water flow from the water source 16 when the pump 12 is not on. In the alternative, the pressure switch can be replaced by a sensor that senses the water level by measuring the resistivity of the fluid in the tank. The system may also have a prefilter 28 located between the pump 12 and the solenoid valve 26.

Figure 2:
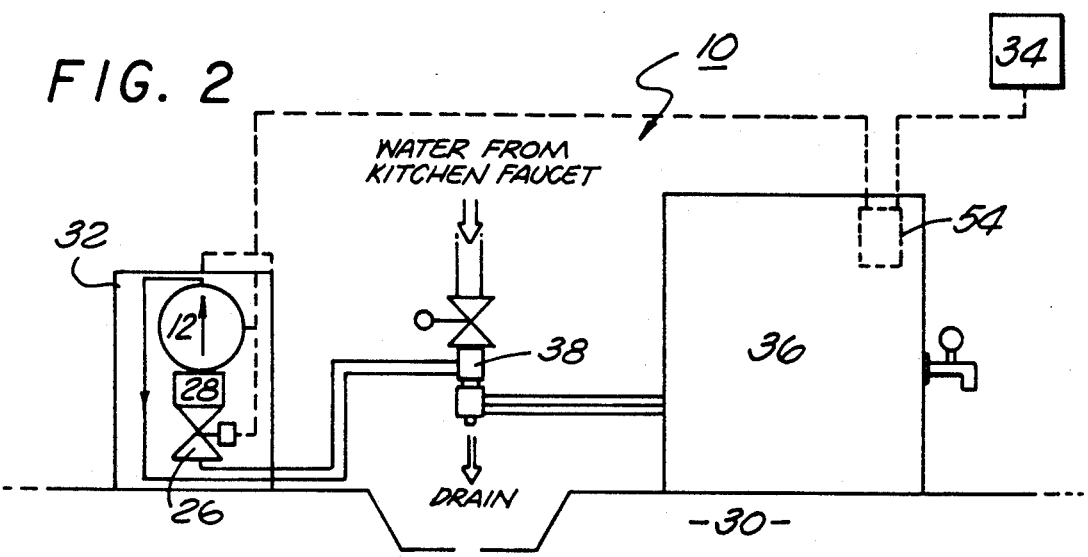
FIG. 2 is a schematic of a reverse osmosis water purification system modified to function on a kitchen counter.
Figure 3:
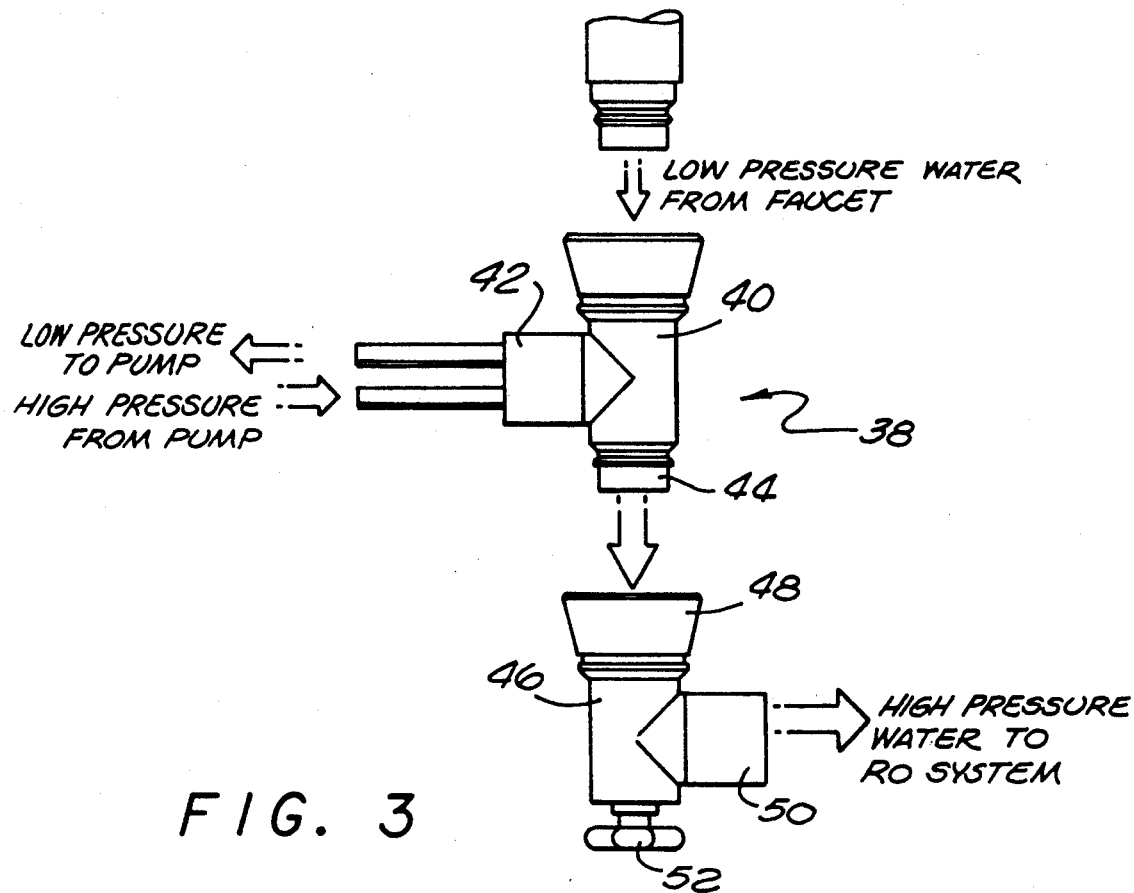
FIG. 3 is a side view of an adapter of the system shown in FIG. 2, which attaches to a faucet and allows water to flow from a pump unit to a RO unit unit.

FIG. 2 shows a preferred embodiment for the present invention, wherein the purification system 10 rests on a counter top 30. This system has essentially four modules that can be used in any kitchen. A pump unit 32 can house the pump 12, motor 14, prefilter 28 and solenoid valve 26. Connected to the pump motor 14 is a transformer 34 that can be easily plugged into an electrical wall socket to provide power to the motor 14. A water unit 36 small enough to fit on the counter top 30 can house the RO unit 18 and the reservoir 22. Connecting the pump unit 32 to the water unit 36 is an adapter unit 38 attached to a faucet that provides water typically from a municipal water supply. As shown in FIG. 3, the adapter unit 38 may have a first quick disconnect 40 with a first port 42 that has two openings, that directs the water from the faucet to the pump and then back to the first disconnect 40 again. The first disconnect 40 also has a second port 44 that allows water to flow into a second quick disconnect 46. The second disconnect 46 has a first port 48 to receive the water and a second port 50 with two openings to allow the water to flow to the RO unit 18 and back to the second disconnect 46, such that the rejected water flows out of a third port 52 into a drain. The quick disconnects can have standard connection means typically found in the art, to allow the user to easily connect and disconnect the connector unit 38 from the faucet.

As shown in FIG. 2, the water unit 36 may have a level sensor 54 to start and stop the pump 12 when the purified water in the reservoir 22 reaches certain predetermined levels. Likewise a timer can be connected to the pump 12, to run the pump 12 for a predetermined amount of time. The times could be proportional to the desired amount of water to be generated (purified) and be inputted and stored using interface and storage means typically found in the appliance art such as microwave ovens.

Figure 4:
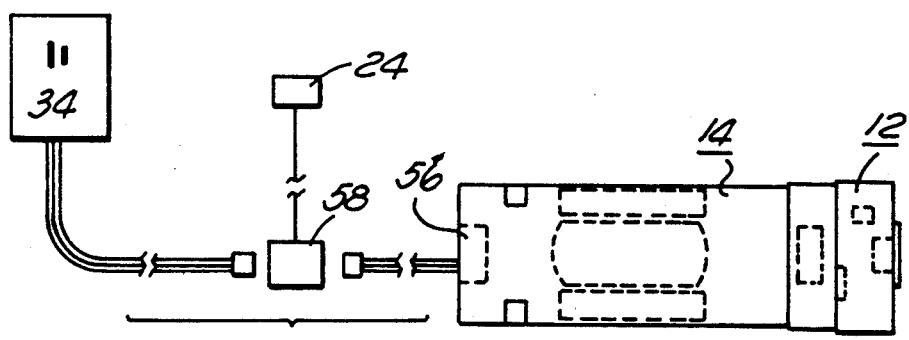
FIG. 4 is a schematic of the transformer, motor and pump of the reverse osmosis water purification system of FIG. 1.

FIG. 4 diagrammatically shows the interconnection between the transformer 34, motor 14 and the pump 12. The transformer typically drops 115 VAC power supplied from an external power source to approximately 24 VAC and 0.6 amps. The motor 14 may also have a full wave rectifier 56 to rectify the 24 VAC power to full wave rectified DC power. The motor 14 can also have a filtering capacitor (not shown) of such size to provide a higher average voltage when the motor has low loads and a lower average voltage when the pump 12 is running at operating pressure. The capacitor also filters high frequency noise generated by the diodes and the commutator.

As shown in FIG. 4, the transformer 34 and motor 14 can be connected to a modular connector 58 that allows the pressure switch 24 or the like, to be easily connected to the transformer 34. It is preferable to place the rectifier 56 in the motor 14, so that AC power can be supplied to the switch 24. It being found that such water sensors 24 switch more efficiently with AC power than with DC. The connector 58 also provides a means to easily detach the motor 14 from the transformer 34 and connect other devices to the system such as a control panel (not shown). The connector 58 can be constructed to detachably connect only the transformer 34 and the motor 14, without a sensor.

When a motor stalls, it will typically draw in more current from the power supply. This high current can overheat and damage the components of the motor. The present invention may include a transformer 34 that has a higher impedance than the motor 14, such that the transformer 34 acts as a current regulator in the event the motor 14 stalls. The higher transformer impedance drops the voltage to the motor, which limits the current rise to safe levels as the motor speed decreases due to increased load thereon. On the other hand, as the current requirements of the motor 14 go down (load decreases), an increased voltage is supplied by the transformer 34. This provides increased pump rates during start up to insure that the pump 12 sweeps out any entrapped air and quickly brings the system 10 up to operating pressure. In the preferred embodiment the ratio of the transformer and motor impedances is approximately 2:1.

The motor 14 produces high torque at a low speed. In the preferred embodiment, the motor 14 is supplied with 24 volts and has a no load speed of 600 revolutions per minute (RPM) or less. This is much lower than pumps presently found in reverse osmosis systems, which have a no load speed ranging from 1500–6000 RPM. The motor 14 is also capable of producing a torque of approximately 20 inch-ounces (in-oz) at a speed of 300 RPMs. This is to be distinguished from present reverse osmosis motors that run at approximately 2000 RPMs at a torque of 20 in-ozs. The low speed continuous motor 14 requires considerably less power resulting in cost savings for the user. The motor 14 can also be built with carbon brushes instead of the copper brushes usually used in low voltage motors. The graphite carbon reduces the friction and wear between the brushes and the commutator, providing a much extended life at the current levels at which the motor operates. The high torque—low speed characteristics of the motor can be achieved by significantly increasing the iron mass and the number of winding turns of the armature, as well as increasing the magnet length, of motors found in the art.

Figure 9:
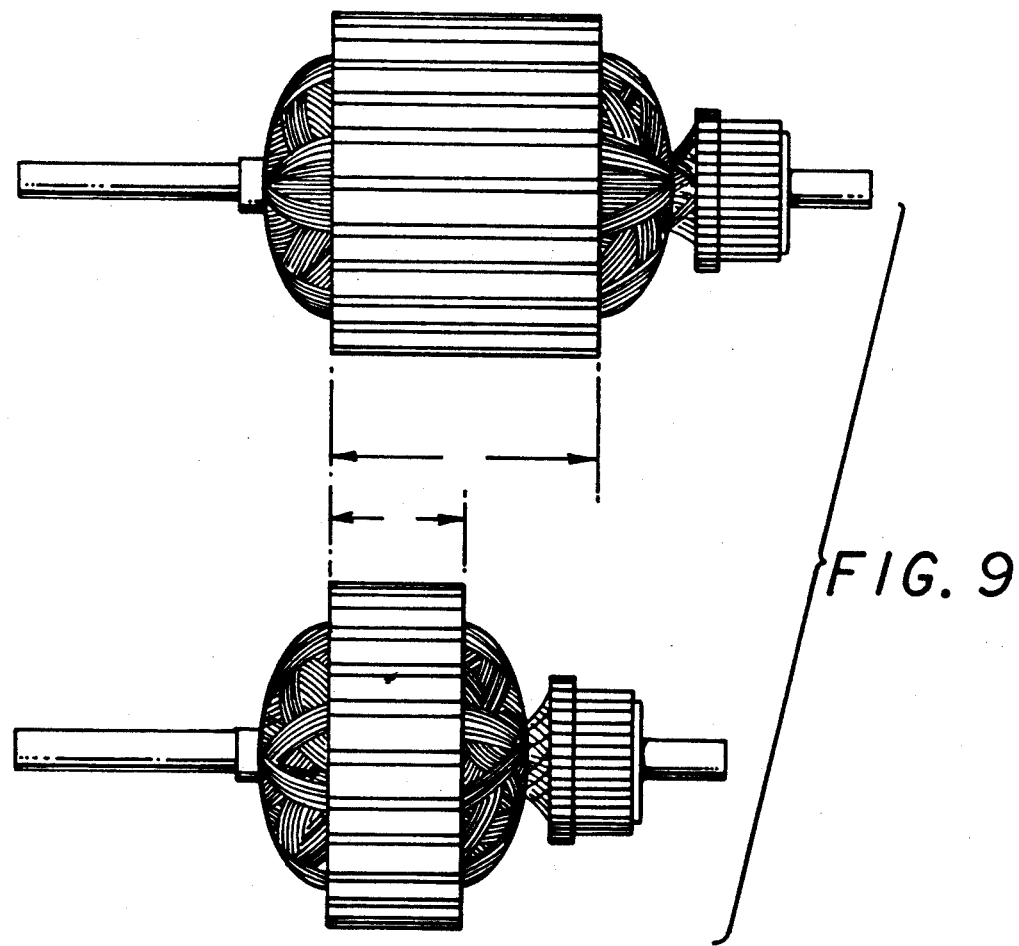
FIG. 9 illustrates a conventional motor rotor and an elongated rotor in accordance with the present invention.

By way of specific example, a conventional motor commonly used with diaphragm pumps of the type described has a laminated rotor approximately 13/16ths inch long, as shown in the lower part of FIG. 9. Aside from the winding length within the rotor slots, the copper in the end turns of the winding is approximately twice as long as that within the slots. Thus if the rotor length is L, the resistance of the portion of the winding in the slots is proportional to L and the resistance of the end turns of the winding is approximately proportional to 2 L, so that the resistance of the total winding is approximately proportional to 3 L. If, on the other hand, the rotor length were to be doubled and the permanent magnet stator made correspondingly longer, then a motor having the same number of turns of the same wire size will have a resistance approximately proportional to 2 L+2 L=4 L. When operating at the same voltage as the original motor under a no load condition, the no load speed of the lengthened motor will be very close to one half the speed of the original motor (due to twice the back EMF generation at any speed). Under stall conditions for the fixed input voltage, the lengthened motor will draw approximately three fourths the current of the original motor due to the increased resistance thereof. However, the stall torque developed because of the increased length of the motor will be twice the torque of the original motor per unit of current. Thus, the lengthened motor will have $\frac{3}{4} \times 2 = 1.5$ times the stall torque of the original motor for the same input voltage. Accordingly, by doubling the length of the rotor, the no load speed of the motor has been cut in half, and at the same time, the stall torque has been increased 50%, while at the same time, the resistance of the winding on the lengthened rotor has been increased approximately one third (from proportional to 3 L to proportional to 4 L), thus reducing the power dissipation under stall of the enlarged motor to 75% of the power dissipation of the original smaller motor.

Now with the speed reduced and the stall torque increased, the effect of other aspects of the preferred embodiment of the present invention can be seen. In particular, if the transformer has a significant output impedance, there will be little effect on the no load and light load speeds, though the stall current will be further reduced and thus the stall torque will be reduced, as will the maximum power dissipation in the motor, such as in the motor brushes, etc. Obviously then, starting current is similarly further reduced, reducing the thermal stress on the windings. Providing a significant output impedance of the transformer in comparison to the motor resistance, even greater than the motor resistance, can be accomplished by using a smaller transformer, thereby reducing bulk and cost of the power supply. Reduction of the motor currents also much better accommodates the use of graphite carbon brushes in a low voltage design because of the lower voltage drop across the brushes. With these changes in the motor and supply, now the (no load) operating voltage of the motor and the power supply impedance may be selected in conjunction with the motor winding to provide the desired stall torque and operating speed. Actually, in the preferred embodiment, the rotor length as may be seen in the upper part of FIG. 9 has been increased over the conventional rotor length by somewhat over a 2 to 1 ratio, the 2 to 1 ratio being used for purposes of explanation herein because of the simple ratios that result therefrom, though of course a ratio of over 2 to 1 even further reduces motor currents, power consumption and no load speed for a given stall torque. In the preferred embodiment, the rotor length 2 L is approximately 1.75 inches long.

Figure 5:
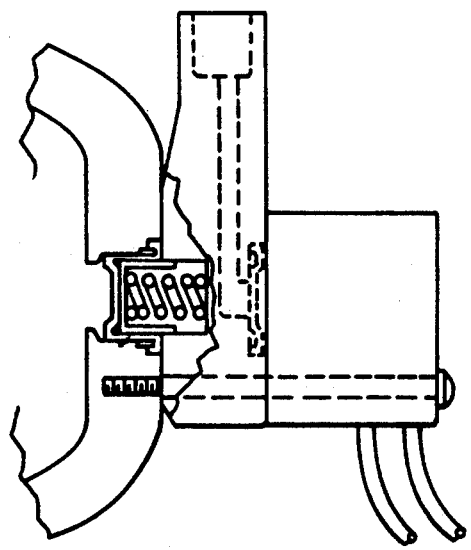
FIG. 5 is a cross-sectional view of a water line with a pulse damper incorporated.

As shown in FIG. 5, the system can also have a pulse damper to damp out any line surges that occur during the start up of the pump 12.

Figure 6A:
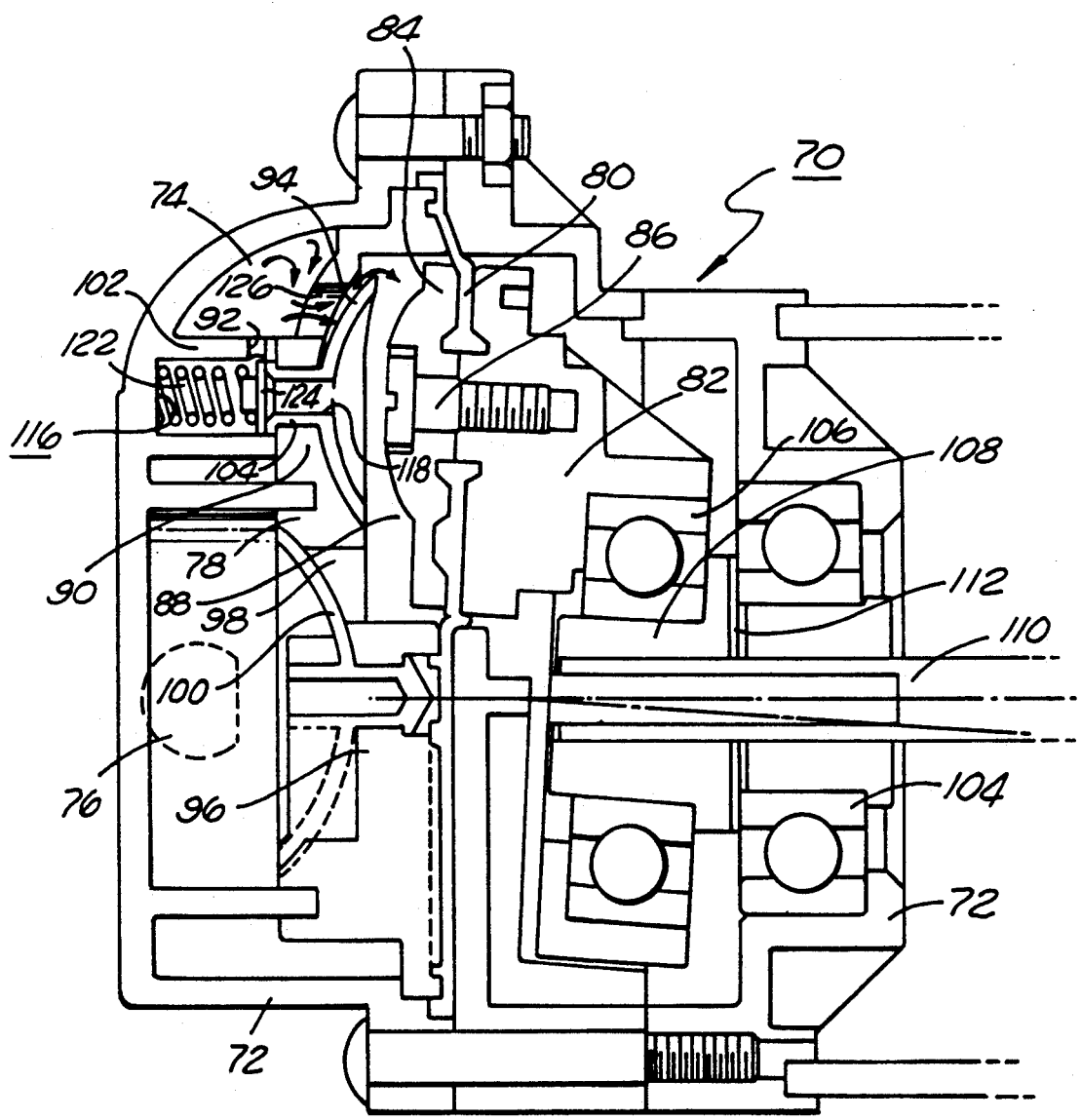
FIG. 6a is a cross-sectional view of a standard diaphragm pump with a pressure relief valve incorporated in the inlet valve of said pump.
Figure 6B:
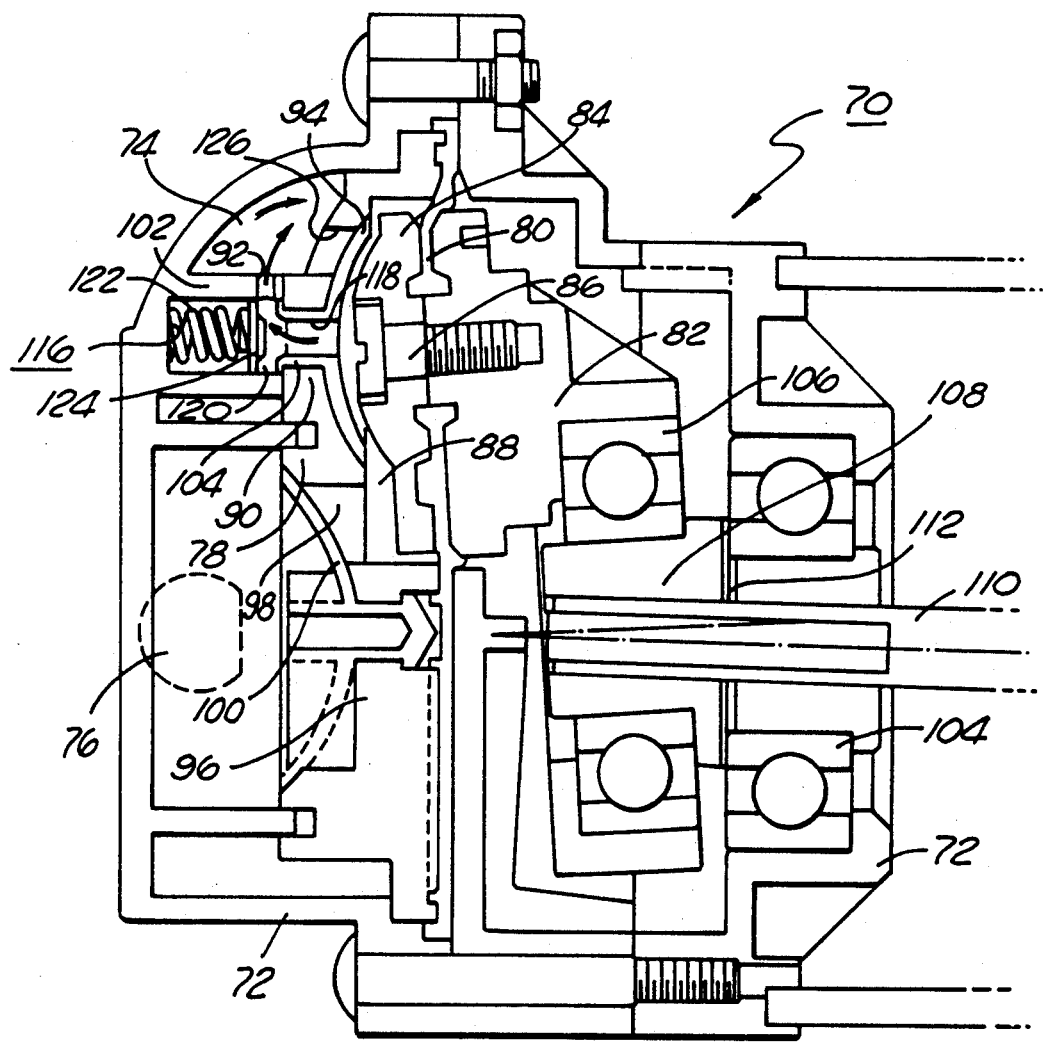
FIG. 6b is a cross sectional view similar to FIG. 6a showing the relief valve in an open position.

In the preferred embodiment the system has a pump 70 as shown in FIGS. 6a and 6b. The pump 70 is a modified diaphragm positive displacement pump like the device disclosed in U.S. Pat. No. 4,610,605 issued to Hartley, which is hereby incorporated by reference. The pump 70 has a housing 72 with an inlet 74 and an outlet 76, that allows fluid to enter from the water source 16 and flow to the RO unit 18, respectively. Within the housing 72 is a valve plate 78 and a diaphragm 80. Attached to the diaphragm 80 is a piston 82 with a piston head 84 attached by a screw 86. The valve plate 78, diaphragm 80 and piston head 84 define a chamber 88. The valve plate 78 has a first valve portion 90 with an inlet opening 92 to allow fluid communication between the housing inlet 74 and the chamber 88. The first valve portion 90 has a flexible first valve 94, typically made of rubber, that deflects when there is a differential pressure between the chamber 88 and housing inlet 74, that allows the water to flow into the chamber 88. The valve plate 78 has a second valve plate portion 96 with an outlet opening 98 that allows fluid communication between the chamber 88 and the housing outlet 76. The second valve portion 96 has a second flexible valve 100 that deflects when there is a differential pressure between the housing outlet 76 and the chamber 88, such that the water can flow from the chamber 84 out of the pump 70. Adjacent the valve plate 78 is an annular flange 102 that houses the stem of the valve 94, the valve stem 104 extends through the plate 78 and attaches the first valve 94 to the plate 78.

The pump piston 82 is attached to a first bearing 106 that contains a wobble plate 108 that is allowed to rotate relative to the bearing 106. The wobble plate 108 is attached to an output shaft 110 of the motor 14 and has a cam 112 that rotates about the longitudinal axis of the shaft 110. The shaft 110 is also attached to a second bearing 114 which keeps the shaft 110 concentric with respect to the housing 72 and provides a bearing surface for the cam 112 of the wobble plate 108. As shown in FIGS. 6a and 6b, when the wobble plate 108 is rotated by the shaft 110, the first bearing 106 moves the piston 82 closer to or farther from the first valve portion 90. When the piston head 84 is moved away from the valve portion 90, the increased chamber area has a pressure less than the water pressure in the housing inlet 74, such that the water pushes the first valve 94 open and enters the chamber 88. When the wobble plate 108 and bearing 106 cause the piston head 84 to move toward the first valve portion 90, the compressed chamber has a water pressure greater than the pump outlet 76, such that the second valve 100 opens to allow the water to flow out of the pump 70. This cycle is repeated, wherein the piston head 84 pumps water from the water source 16 to the RO unit 18 when the output shaft 110 is rotated by the motor 14. In the prior art, the wobble plate had a cam angle of 3 degrees. Because of the low flow rate requirements of the pump 12, it is preferable to reduce the cam angle to between 1 and 2 degrees. The lower cam angle reduces the flow rate and the amount of piston displacement, which reduces the torque requirements of the motor 14 at a given pressure, again increasing the life of the motor. To assure evacuation of entrapped air, the dead space between the piston and the valve plate can be minimized by inserting a shim between the fixed bearing and the wobble plate bearing or by using specially designed pistons.

Figure 7:
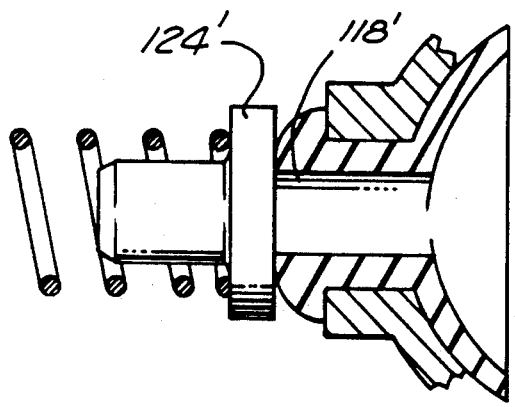
FIG. 7 is an enlarged view of an alternate embodiment of a pressure relief valve within the pump.

To incorporate a relief valve 116 into the pump 70, a relief opening 118 is drilled through the valve stem 104 that can allow fluid communication between the piston chamber 88 and flange chamber 120. A spring 122 with an end cap 124 can be seated within the annular flange 102, such that the end cap 124 prevents water from flowing into the flange chamber 120. When the pressure of the water in the piston chamber 88 exceeds the spring force of the spring 122, the water unseats the end cap 114 from the relief opening 118, allowing the water to flow into the flange chamber 120 and into the housing inlet 74 through a flange opening 126. The spring 122 can be compressed a predetermined distance such that the water pressure has to exceed a predetermined value, equal to the product of the compressed distance and the spring constant, before the relief valve 116 opens. FIG. 7 shows an alternate embodiment of the relief valve with a flush end cap 124' that regulates flow through a straight relief opening 118'. When the fluid pressure exceeds a predetermined level, the flat end cap 124' and spring 122 will open and close the relief opening 118' in an oscillating manner. The mass of the end cap 124' and the spring rate of the spring 122 may be such that oscillation of the valve produces an audible sound, providing an indication to the user that the pump is in a bypass condition.

Figure 8:
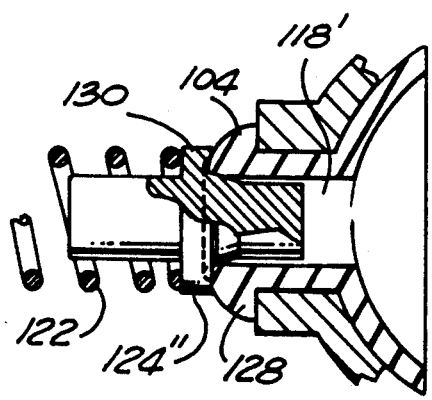
FIG. 8 is an enlarged view of an alternate embodiment of a pressure relief valve within the pump.

FIG. 8 shows another alternate embodiment of the relief valve 116, wherein the end cap 124'' has a first valve section 128 that extends into the relief opening 118'. The first valve section 128 extends from a second valve section 130 that seats on the valve stem 104. The area of the second valve section 130 is larger than the area of the first valve section 128. When the fluid pressure pushes the first valve section 128 out of the relief opening a predetermined distance, the fluid comes in contact with and pushes the second valve section 130. Because the area of the second valve section 130 is greater than the first valve section 128, there is a sudden increase in the force directed by the fluid against the spring 122. To close the valve, the pressure in the fluid must drop below the pressure that was required to open the valve. By constructing the valve to open and close at different pressures, oscillation of the valve about a relief opening pressure is avoided.

Thus what is disclosed is a simple and inexpensive way of modifying a Hartley type pump to incorporate a relief valve 116. The relief valve allows the pump 70 to continue to operate even when the pump output pressure is beyond operating levels. The continuous operation of the pump prevents stall which can damage or destroy the motor. The relief valve allows the pump to operate if the RO unit is clogged or the flow rate across the osmotic membrane is less than the output of the pump. In this manner the relief valve acts like a pressure switch of the prior art, wherein the relief valve 116 cycles the the excess water back into the pump inlet 74 as opposed to constantly starting and stopping the pump 12. The continuous smooth operation of the pump 12 greatly increases the life thereof. The incorporation of the relief valve 116 internally within the pump 12 also reduces the possibilities of leakage and the overall size of the system 10.

While certain exemplary embodiments have been shown and described in the above description and accompanying drawings, it is to be understood that such embodiments are merely illustrative of, and not restrictive on the broad invention, and that this invention not be limited to the specific constructions and arrangements shown and described, since various other modifications may occur to those ordinarily skilled in the art.

What is claimed is:

1. A reverse osmosis water purification system that can purify water from a water source, comprising:
   a filter having an inlet and an outlet, said filter further having an osmotic membrane that filters water at a flow rate and operates at a water pressure that does not exceed a maximum pressure;
   a pump operatively connected to the water source and said filter inlet to pump water from the water source to said filter, said pump including;
   a housing having an inlet and an outlet;
   a diaphragm mounted within said housing;
   a piston having a piston head attached to said diaphragm;
   a wobble plate operatively connected to said piston, said wobble plate having a cam surface with a predetermined cam angle;
   a bearing operatively connected to said housing such that said bearing can rotate relative to said housing surface, said bearing having a first surface that operatively engages said cam surface;
   a valve plate mounted inside said housing, said valve plate having a first and second valve portion constructed such that said valve portions, said piston and said diaphragm form a chamber, said first valve portion further has an inlet opening to allow fluid communication between said housing inlet and said chamber, said second valve portion has an outlet opening to allow fluid communication between said chamber and said housing outlet, said first valve portion and said housing defining a valve chamber that is in fluid communication with said housing inlet;
   a motor output shaft attached to said wobble plate to rotate said wobble plate such that said piston is moved relative to said valve plate to expand and contract said chamber in accordance with said cam engagement with said bearing;
   a first valve operatively connected to said first valve portion adapted to allow one way fluid communication from said housing inlet to said chamber through said inlet opening when the fluid pressure in said housing inlet is greater than the fluid pressure in said chamber, said first valve having a first valve opening that can provide fluid communication between said chamber and said valve chamber;
   a second valve operatively connected to said second valve portion adapted to allow one way fluid communication from said chamber to said housing outlet through said outlet opening when the fluid pressure in said chamber is greater than the fluid pressure in said housing outlet; and
   a by-pass valve being located within said valve chamber and adapted to control the flow of fluid through said first valve opening such that said pump outlet water pressure does not exceed the maximum pressure of said filter;
   a motor operatively connected to said pump, said motor being adapted to drive said pump so that said pump provides a water flow rate that is approximately equal to the flow rate of said filter;
   a storage tank connected to said filter outlet; and,
   logic means operatively connected to said storage tank and said motor for starting said motor when the water within said storage tank reaches a first level and stopping said motor when the water within said storage tank reaches a second level that is greater than said first level, wherein said by-pass valve opens to allow said motor and said pump to run continuously while the water within said storage tank rises from said first level to said second level.

2. The system as recited in claim 1, wherein said pressure adjustment valve has a spring that is in compression a predetermined distance and has a predetermined spring constant, such that the product of said predetermined distance and said spring constant define the water pressure at which said by-pass valve opens and allows fluid communication between said valve chamber and said housing inlet.

3. The system as recited in claim 2, wherein said by-pass valve includes an end cap coupled to said spring and adapted to close said first valve opening.

4. The system as recited in claim 3, wherein said spring constant and said end cap mass are such that said by-pass valve produces an audible sound when the water pressure exceeds a predetermined level.

5. The system as recited in claim 3, wherein said end cap has first and second valve sections constructed so that said end cap opens at a first predetermined water pressure and closes at a second predetermined water pressure, wherein said first water pressure is greater than said second water pressure.

6. The system as recited in claim 1, further comprising a transformer operatively connected to said motor and an external electrical power source that provides alternating current at a first predetermined voltage, said transformer providing an output voltage to said motor having a second predetermined voltage lower in value than said first predetermined voltage.

7. The system as recited in claim 6, further providing a connector that allows said motor to be detachably connected to said transformer.

8. The system as recited in claim 6, wherein said second predetermined voltage is approximately 24 volts.

9. The system as recited in claim 8, wherein said transformer delivers power to said motor at approximately 0.6 amps.

10. The system as recited in claim 6, wherein said motor has rectifying means to rectify said alternating voltage to a direct voltage.

11. The system as recited in claim 10, wherein said motor has a filtering capacitor to provide a third predetermined voltage to the motor when said pump is pumping the water at an operating pressure and to provide a fourth predetermined voltage greater in value than said third predetermined voltage when said pump is producing a water pressure significantly lower than said operating pressure.

12. The system as recited in claim 6, wherein said motor creates a high torque at a low speed.

13. The system as recited in claim 12, wherein said motor has a rotor length of approximately 1.75 inches.

14. The system as recited in claim 13, wherein said motor has a stall speed of approximately 600 RPMs.

15. The system as recited in claim 14, wherein said motor is constructed to produce a torque of approximately 20 in-ozs at a speed of approximately 300 RPMs.

16. The system as recited in claim 15, wherein said transformer has an impedance higher than an impedance of said motor.

17. The system as recited in claim 16, wherein said transformer impedance is approximately twice said motor impedance.

* * * * *